United States Patent [19]

Howard et al.

[11] Patent Number: 5,764,742

[45] Date of Patent: Jun. 9, 1998

[54] SYSTEM FOR ACCESSING TELEPHONIC COMMUNICATIONS AND FOR CONDUCTING TELEPHONIC TRANSACTIONS

[76] Inventors: Sheldon Howard, 20224 Sherman Way, #46, Canoga Park, Calif. 91306; Lawrence Brilliant, 8 Ralston Ave., Mill Valley, Calif. 94941

[21] Appl. No.: 612,320

[22] Filed: Mar. 7, 1996

Related U.S. Application Data

[63] Continuation-in-part of Ser. No. 420,375, Apr. 7, 1995, abandoned.

[51] Int. Cl.[6] .......................... H04M 15/00; H04M 1/00; H04M 3/00
[52] U.S. Cl. .......................... 379/114; 379/355; 379/356
[58] Field of Search .......................... 379/91, 112, 114, 379/130, 140, 144, 354, 355, 356, 357; 235/494, 493, 380, 379; 359/17, 125, 299, 310

[56] References Cited

U.S. PATENT DOCUMENTS

| | | |
|---|---|---|
| 3,022,381 | 2/1962 | Pferd . |
| 3,659,080 | 4/1972 | Smith . |
| 3,727,010 | 4/1973 | Fuyama et al. . |
| 3,731,065 | 5/1973 | Zucker . |
| 3,991,300 | 11/1976 | Chadima, Jr. . |
| 4,328,415 | 5/1982 | Eaton . |
| 4,362,928 | 12/1982 | Sheldon . |
| 4,408,121 | 10/1983 | Galatha . |
| 4,535,204 | 8/1985 | Hughes et al. . |
| 4,605,846 | 8/1986 | Duret et al. . |
| 4,630,201 | 12/1986 | White . |
| 4,706,275 | 11/1987 | Kamil . |
| 4,794,239 | 12/1988 | Allais . |
| 4,814,589 | 3/1989 | Storch et al. . |
| 4,817,136 | 3/1989 | Rhoads ............................ 379/357 |
| 4,860,336 | 8/1989 | D'Avello et al. ............... 379/63 |
| 4,868,849 | 9/1989 | Tamaoki . |
| 4,879,744 | 11/1989 | Tasaki et al. .................. 379/144 |
| 4,975,948 | 12/1990 | Andresen et al. . |
| 4,980,910 | 12/1990 | Oba et al. . |
| 4,990,756 | 2/1991 | Hoemann . |
| 4,992,650 | 2/1991 | Somerville . |
| 5,079,411 | 1/1992 | Lee . |
| 5,093,862 | 3/1992 | Scwartz . |
| 5,121,126 | 6/1992 | Clagett ........................... 342/419 |
| 5,140,645 | 8/1992 | Whitaker . |
| 5,144,654 | 9/1992 | Kelley et al. .................. 379/356 |
| 5,266,782 | 11/1993 | Alanärä et al. . |
| 5,283,422 | 2/1994 | Storch et al. . |
| 5,298,731 | 3/1994 | Ett . |
| 5,304,786 | 4/1994 | Pavlidis et al. . |
| 5,343,519 | 8/1994 | Feldman ......................... 379/355 |

(List continued on next page.)

FOREIGN PATENT DOCUMENTS

| | | |
|---|---|---|
| 276-103-A | 11/1986 | European Pat. Off. . |
| 61-100061 | 5/1986 | Japan . |
| 63-104556 | 5/1988 | Japan . |
| 1-251942 | 10/1989 | Japan . |

*Primary Examiner*—Curtis A. Kuntz
*Assistant Examiner*—Rexford N. Barnie
*Attorney, Agent, or Firm*—Blakely, Sokoloff, Taylor & Zafman LLP

[57] ABSTRACT

A telephone access system utilizes a calling card that is encoded with a machine readable code for both an access telephone number and a personal identification number. A reader/dialer is used to read the data encoded on the calling card and to generate dialing tones corresponding thereto. Once the data encoded on the calling card has been entered into the reader/dialer, the calling card may be stored in a secured location. To access the calling account, the reader/dialer is held to the mouthpiece of a standard telephone set and is actuated to emit the tones corresponding to the access telephone number. Subsequently, tones corresponding to the personal identification number are emitted under automatic or manual control. Once the account has been verified, the caller proceeds to enter a desired destination telephone number or conduct a telephonic transaction.

12 Claims, 5 Drawing Sheets

U.S. PATENT DOCUMENTS

| | | | |
|---|---|---|---|
| 5,377,263 | 12/1994 | Bazemore et al. | 379/355 |
| 5,452,352 | 9/1995 | Talton | 379/355 |
| 5,455,857 | 10/1995 | McGuire | 379/355 |
| 5,461,291 | 10/1995 | Barrus | 379/67 |
| 5,478,993 | 12/1995 | Derksen . | |
| 5,479,515 | 12/1995 | Longacre, Jr. . | |
| 5,481,103 | 1/1996 | Wang . | |
| 5,489,158 | 2/1996 | Wang et al. . | |
| 5,497,411 | 3/1996 | Pellerin | 379/59 |
| 5,504,808 | 4/1996 | Hamrick, Jr. | 379/144 |
| 5,539,819 | 7/1996 | Sonoyama et al. | 379/355 |
| 5,623,539 | 4/1997 | Bassenyemukasa et al. | 379/88 |

SYSTEM FOR ACCESSING TELEPHONIC COMMUNICATIONS AND FOR CONDUCTING TELEPHONIC TRANSACTIONS

RELATED APPLICATION

This is a continuation-in-part of application Ser. No. 08,420,375, filed on Apr. 7, 1995 abandoned.

BACKGROUND OF THE INVENTION

1. Field of the Invention

This invention relates to the general field of telephone communication systems, and more particularly, to a system for providing access to prepaid or post-paid calling services and for conducting telephonic transactions.

2. Background Art

The distribution and use of prepaid calling cards is expanding rapidly throughout the world. Such cards are sold to end users or may be given away as promotional items. A typical prepaid calling card has printed thereon a toll-free telephone number to access a central accounting system. When the toll-free access number is called, the caller is prompted to enter an identification number which, typically, is also printed on the calling card. For each identification number, an account is established for a predetermined amount of telephone service denominated in either minutes or dollars. If the account associated with the caller's identification number is not exhausted, the caller is then prompted to enter the desired telephone number and a connection is established.

Prepaid calling accounts may be maintained directly by telephone service providers or by resellers who buy long distance telephone time in bulk and then resell it to consumers. Generally speaking, in either case, the only information necessary to access an account is the toll-free access number and the specific account or personal identification number (PIN). Security is therefore a concern. Thus, the PIN is often concealed on the prepaid calling card by a rub-off coating or some other means so that the purchaser will have some assurance of receiving the full value of the card.

Some prepaid calling cards have only a machine readable access number and PIN number, typically using a magnetic strip. These cards can only be used with specially equipped telephone sets that have built-in card readers. Adding a magnetic strip also significantly increases the cost of the calling card.

SUMMARY OF THE INVENTION

The present invention comprises a telephone access system in which a calling card is encoded with a machine readable code for both the access telephone number and PIN number. A separate, hand-held reader/dialer is used to read the data encoded on the calling card and to generate dialing tones corresponding thereto. Once the data encoded on the calling card has been entered into the reader/dialer, the calling card may be stored in a secure location. To access the calling account, the reader/dialer is held to the mouthpiece of a standard telephone set and is actuated to emit the tones corresponding to the access telephone number. Subsequently, tones corresponding to the PIN number are emitted under automatic or manual control. Once the account has been verified, the caller proceeds to enter a desired destination telephone number.

The calling card is encoded with a printed data scheme that can be utilized on a variety of other substrates, such as business cards, magazine inserts, etc. Any such materials can thereby be encoded with a telephone number or other useful tone encoded data that may then be entered into the reader/dialer for subsequent use. The reader/dialer may also read data from a light emitting screen, such as in a computer system, automatic teller machine (ATM), etc.

The reader/dialer is useful not only for accessing a telephone communications system, but also for conducting a variety of telephonic transactions. For example, an enhanced reader/dialer with a keyboard and display can be employed as an intelligent terminal for communicating with systems operated by merchandisers, information providers, etc.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
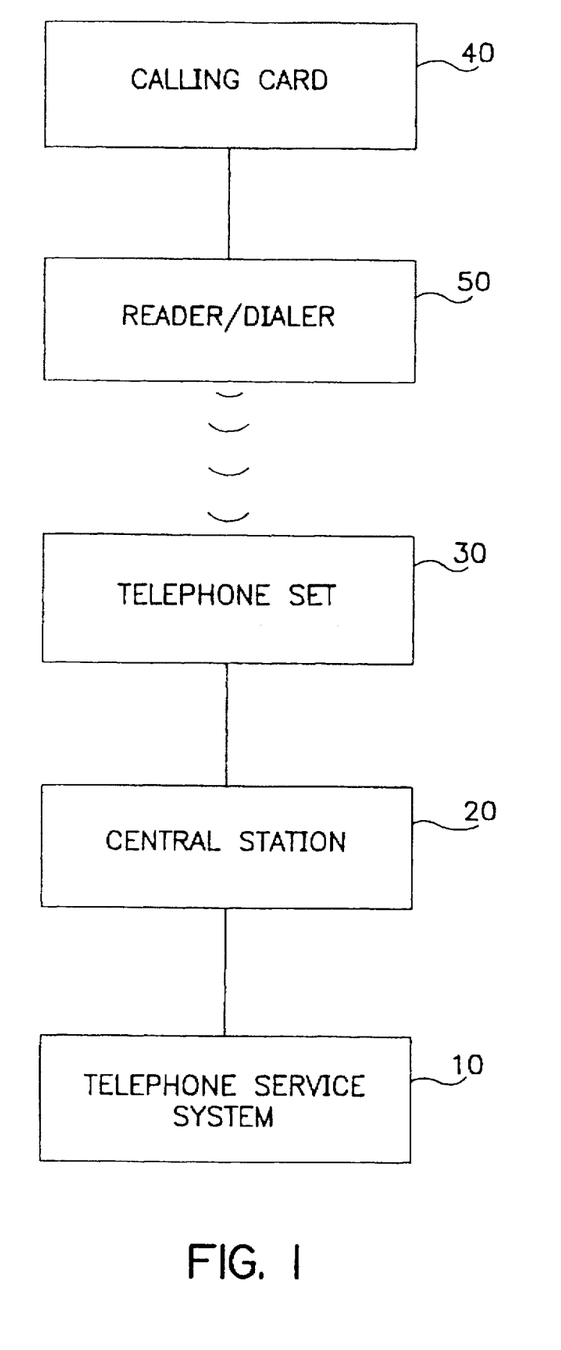
FIG. 1 is a block diagram of a prepaid telephone calling system according to the present invention.

FIG. 1 is a block diagram of a telephone access system according to the present invention. The invention can be implemented with any type of card, either prepaid or post-paid. The following discussion is generally in the context of a prepaid calling card. A telephone service system 10 comprises a network of long distance communications facilities for providing telephonic connections around the world. Such systems are operated by major communications companies such as AT&T, MCI and the like. For purposes of the present invention, access to telephone service system 10 is provided through a central station 20. Such a station may be operated by the communications carrier, but is more typically operated by a reseller who buys time in bulk from the system carrier and resells to consumers. Central station 20 includes the necessary switching equipment to receive incoming calls and route them into the service system 10. Central station 20 also includes data processing equipment to maintain a large number of individual accounts. Each such account has an associated access code or personal identification number (PIN).

Access to central station 20 is made with a conventional telephone set 30. This may be virtually any type of residential, business, pay or cellular telephone as long as the service connection for the telephone set has Touch Tone capability. A caller desiring to utilize the system of the present invention must first acquire a calling card 40. This card may be purchased in the manner of conventional prepaid calling cards or may be received as a promotional item. Calling card 40 is encoded with a telephone number for accessing central station 20 and a PIN number. Typically, the telephone number is a toll-free number permitting nationwide or even worldwide access to the calling system. The telephone number and PIN number are preferably encoded on card 40 in the manner described below. In some applications, card 40 may also be encoded with a destination telephone number. Thus, for example, card 40 could be a "call home" card that can be used to automatically call a predetermined destination number. With such a card, the caller need not remember or even know any part of the access number, PIN number or destination number. This makes the system particularly useful as an intelligent gateway to enhanced telecommunications services. Card 40 can be programmed with all information necessary to access a particular service, regardless of whether the service is offered free or is charged to an account assigned to the caller.

In order to retrieve and utilize the information encoded on card 40, a separate reader/dialer 50 is used. This device, which is more fully described below, includes a reader section to interpret the information encoded on card 40 and a dialer section to generate dual-tone multiple-frequency (DTMF) tones corresponding to the encoded information. Reader/dialer 50 preferably has a slot through which card 40 is "swiped" to retrieve the encoded information. The information is then stored in an internal memory for later use in placing calls.

Whenever it is desired to place a call, the dialer section of unit 50 is brought into proximity with the mouthpiece of telephone set 30 and is actuated by a button or other suitable control. The DTMF tone sequence corresponding to the access telephone number is then produced to establish a connection with central station 20. Depending on the calling protocol, reader/dialer 50 may then proceed to automatically generate a DTMF tone sequence corresponding to the stored PIN number, with an appropriate delay if necessary, or a second actuation of the control button may be required. Once the PIN number and account status has been verified by central station 20, the caller is presented with a dial tone and the desired destination number may then be entered. This may be done manually by the caller or, alternatively, one or more destination numbers may be stored in reader/dialer 50. Upon actuation of the appropriate control, DTMF tones are generated for the selected stored destination number. Other access protocols may be employed. For example, the destination number may be entered prior to entering the PIN number. To accommodate the various possible protocols, it is preferred that separate controls be provided for enabling generation of tones corresponding to each of the access telephone number, PIN number and destination telephone number.

By separating the functions of calling card 40 and reader/dialer 50, several advantages are realized. A single reader/dialer may be utilized with a large number of calling cards. In this manner, separate accounts may be maintained for specific matters requiring telephone communication. As an example, an attorney can maintain separate client accounts for long distance telephone calls by simply having a separate calling card for each client. Furthermore, the use of a single reader/dialer with many calling cards facilitates the use of "call home" type cards.

A single calling card may be utilized with multiple reader/dialers. This allows multiple users to access a single account. For example, each member of a family may have his or her own reader/dialer, with a single calling card being swiped through each of the reader/dialers.

Figure 2:
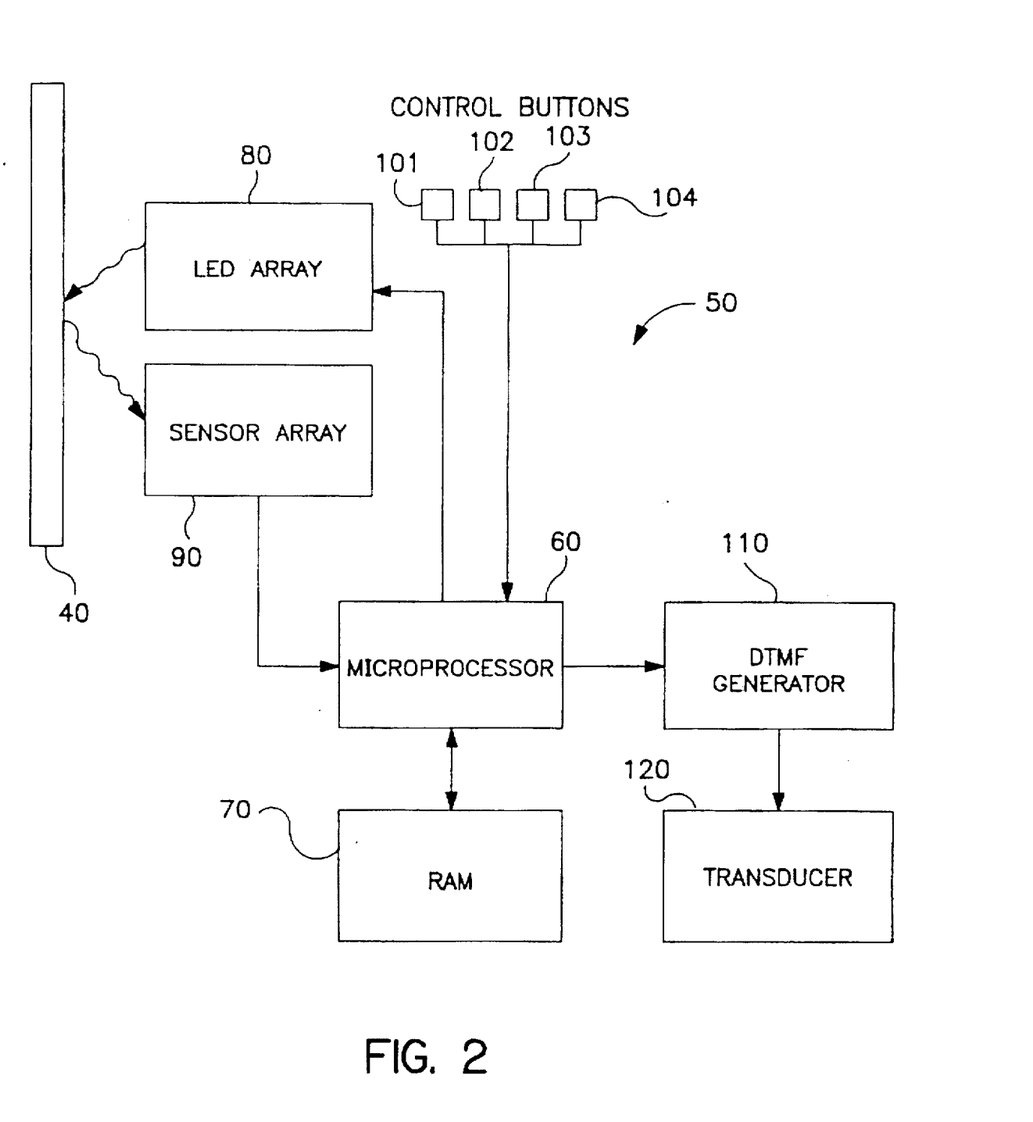
FIG. 2 is a functional block diagram of a reader/dialer suitable for use with the present invention.

FIG. 2 is a functional block diagram of reader/dialer 50. Operation of the device is controlled by microprocessor 60. Associated with microprocessor 60 is a non-volatile random access memory (RAM) 70, which may be on the same chip as the microprocessor or may be a separate device. A light emitting diode (LED) array 80 is arranged to illuminate the coded stripes of a calling card 40 as more fully explained below. A corresponding sensor array 90 is arranged to receive the reflected light from respective LEDs. Outputs of the sensor array are received by microprocessor 60. The corresponding alphanumeric string of characters is validated and stored in RAM 70.

Upon actuation of push button 101, an access number stored in RAM 70 is retrieved and appropriate control signals are sent to DTMF generator 110. Appropriate DTMF tones are generated and provided to transducer 120, which produces audible DTMF tones. Likewise, push button 102 controls retrieval of the caller's PIN number and generation of corresponding DTMF tones. Push button 103 controls the corresponding functions for a destination telephone number. These buttons are depressed in the appropriate sequence required by the particular protocol established by the service provider.

A separate push button 104 is preferably provided for controlling LED array 80. Actuation of push button 104 energizes the LEDs for a predetermined brief period of time so as to conserve battery power. As an alternative to a separate push button 104, a combination of push buttons 101–103 could be used to energize the LEDs. Yet another alternative would be a mechanical or optical switch that would sense when a card 40 is swiped.

Figure 3:
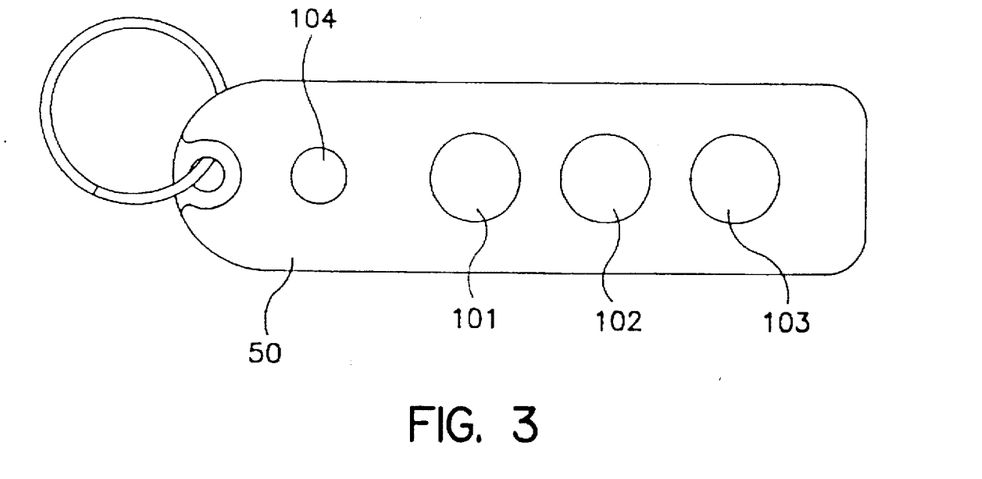
FIG. 3 illustrates the external appearance of the reader/dialer of FIG. 2.

Referring now to FIG. 3, reader/dialer 50 is preferably configured as a very small hand held device suitable for attachment to a key ring; however, the invention is not limited in this regard. Reader/dialer 50 may also be configured in other ways that are convenient to be carried on the person. For example, reader/dialer 50 could be incorporated into a pen or a watch. Furthermore, the functionality of reader/dialer 50 may be incorporated within a telephone set. For example, a cellular telephone incorporating the functionality of reader/dialer 50 could automatically place a call to a business contact with a simple swipe of the contact's coded business card. Such functionality can be incorporated into any other type of telephone set and would be particularly useful in public pay telephones and hotel room telephones.

Reader/dialer 50 preferably includes security features to prevent unauthorized use of the calling account. One such security feature is an automatic lock-out that prevents use of the device unless a security code is first entered by the user. The code is entered with a sequence of the control buttons or by swiping a special access card. A code restricted to combinations of the digits 1, 2 and 3 can be readily entered using the control buttons 101–103. However the code is entered, reader/dialer 50 preferably remains unlocked for a predetermined period of time, such as 30 minutes. This provides the authorized user ample time to complete one or more telephone calls, but effectively prevents an unauthorized user from utilizing the device.

A separate security function is directed to the problem of unauthorized access to a calling account by capturing and reusing the PIN tones. This features generates a new PIN each time that the device is used. An algorithm programmed into the device calculates each new PIN in synchronism with a matching algorithm at the central station 20. By generating the PIN upon each use of the device, interception of the PIN tones would not permit access to the calling account without knowledge of the encryption algorithm. Any one of various algorithms could be employed. For example, the PIN could be simply incremented with a predetermined digit at each use. Alternatively, the PIN could be incremented with an encryption algorithm using a predetermined seed number or with a value computed as a function of the time of day. Various alternative algorithms will be apparent to persons of skill in the art.

Figure 4:
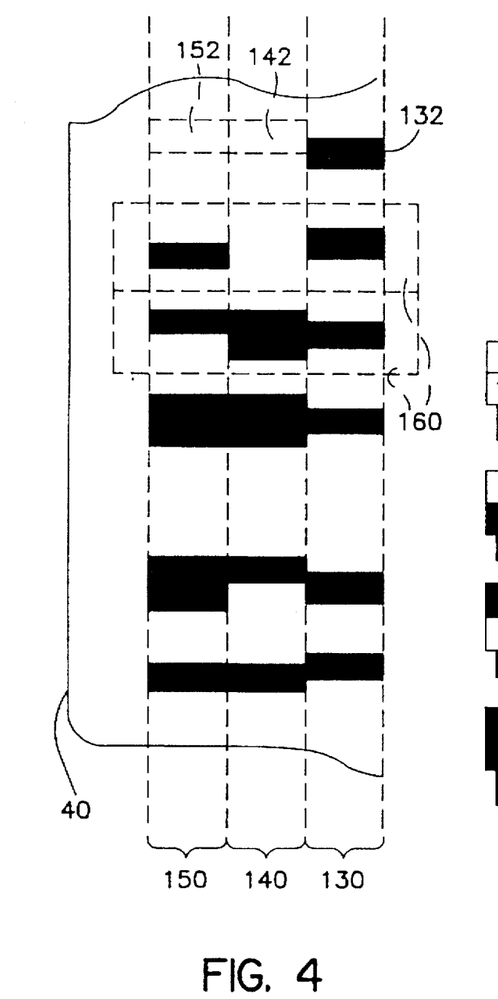
FIG. 4 illustrates a data encoding scheme suitable for use with the present invention.
Figure 5:
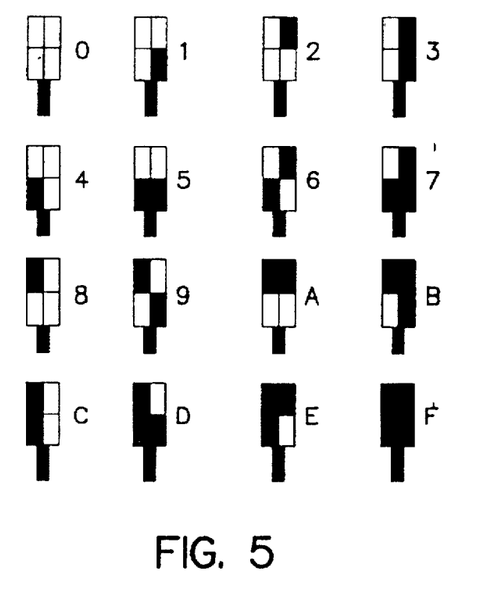
FIG. 5 illustrates the correspondence between the various possible data clusters and hexadecimal characters.

FIG. 4 illustrates a preferred manner by which calling card 40 may be conveniently encoded. One side of card 40, preferably the back, is imprinted with three adjacent stripes of marks along one edge of the card. These marks must contrast with the background surface of card 40 so that there will be an observable difference in reflectivity when illuminated by LED array 80. A first stripe 130 comprises a sequence of reference or timing marks 132. Adjacent stripes 140 and 150 contain data marks. Each timing mark 132 is associated with four adjacent data areas 141, 142,151 and 152, any or all of which may contain a data mark. A data cluster 160 consisting of one timing mark and the four data areas associated therewith can be marked in any one of 16 possible ways. Each data cluster is therefore capable of representing a single hexadecimal character. One possible mapping of data marking patterns to hexadecimal characters is illustrated in FIG. 5. It will be recognized that sensor array 90 shown in FIG. 2 need have only three sensors in order to decode the hexadecimal data. As each edge of a timing mark is encountered in stripe 130, the outputs of the sensors aligned with stripes 140 and 150 are gated, and the presence or absence of a data mark is detected. Thus, when the leading edge of timing mark 132 is detected, data areas 141 and 151 are read by the respective sensors. Likewise, when the trailing edge of timing mark 132 is detected, data areas 142 and 152 are read.

It should be observed that the size and shape of the data clusters are essentially arbitrary. To some extent, the size of the individual data marks is determined by the resolution of the printing process. Naturally, the spacing of stripes 130, 140 and 150 must correspond to the spacing of the sensors in array 90. In a preferred embodiment, stripes 130, 140 and 150 each have a width of 0.1 inch and the data marks have a pitch of 0.05 inch.

Although two data stripes are shown, any number of stripes could be used. For example, three data stripes and a data cluster of six areas would accommodate a full alphanumeric set of up to 64 characters. It will be apparent that the data cluster can be expanded even further if desired.

The data encoding scheme described above is not limited to use on calling card 40. The same data encoding scheme could be used, for example, on a conventional business card. In this manner, the business card may be encoded with the person's telephone number, and such number can thereby be entered into the memory of reader/dialer 50 by simply swiping the business card. As another example, a telephone number could be printed along the edge of a magazine advertisement or virtually any other printed material.

Figure 6:
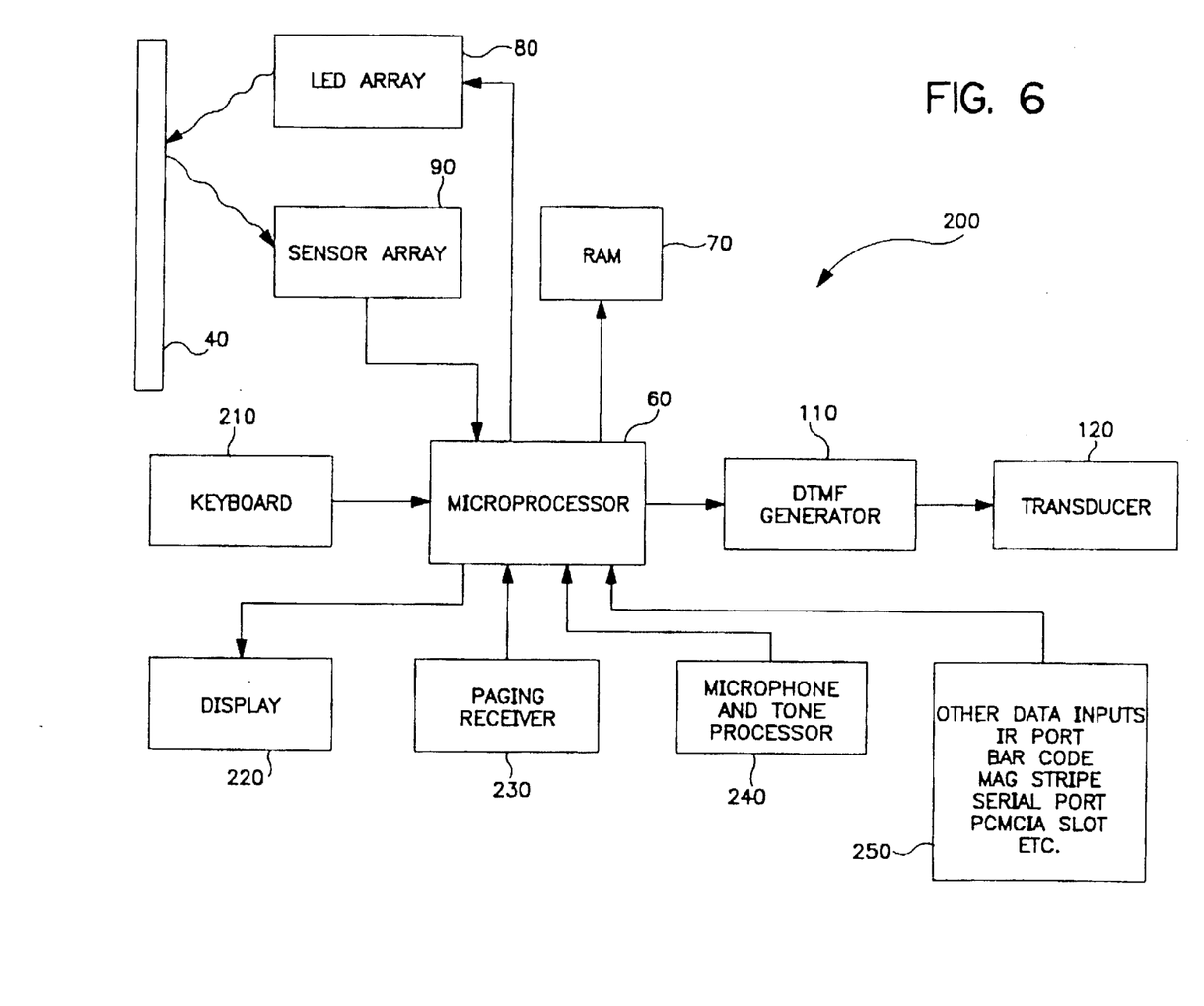
FIG. 6 is a functional block diagram of a reader/dialer with enhanced features.

Referring now to FIG. 6, an enhanced reader/dialer 200 is illustrated in block diagram form. All of the functional elements of device 50 are included within device 200 and the discussion thereof will not be repeated. Device 200 incorporates a number of additional features and functions. It will be apparent that alternative embodiments may incorporate only certain ones of these features and functions.

Device 200 includes an expanded keyboard 210, which preferably has full alphanumeric capability and may be in the form of a standard QWERTY layout. Device 200 also includes a display 220 with which information, such as names and associated telephone numbers, may be displayed to the user. The addition of keyboard 210 and display 220 allows the user to enter a plurality of destination telephone numbers and to scroll through them or otherwise search for a desired number.

One of the significant features of device 200 is the inclusion of a paging receiver 230. This permits device 200 to perform the functions of a conventional pager, i.e., alerting the user to an incoming page and displaying alphanumeric information transmitted with the paging signal. However, owing to the telephone system access features of device 200, the information transmitted with the paging signal can be readily used to automatically return the call. In this mode, the device operates as has been previously described, but there is no need to scan in the destination telephone number since it is available in digital format from the paging receiver. Software is preferably included in the operational software for microprocessor 60 that verifies the proper format and area code of the destination telephone number.

Device 200 may also include a microphone and tone processor 240 so that DTMF tones can be input directly. This allows destination telephone numbers to be captured when dialing a telephone in a conventional manner and also permits destination telephone numbers to be transmitted aurally by telephone. Once received, the DTMF tones are converted to digital format by the tone processor and are thereafter handled in the same manner as a destination telephone number that has been input using any of the other capabilities of device 200. With appropriate voice recognition software in microprocessor 60, device 200 would be capable of interpreting spoken telephone numbers or other messages. This would also facilitate the search for a stored telephone number since the user could simply speak the name of the person to whom a call is to be made.

In device 200, sensor array 90 is preferably arranged so that it can receive inputs directly rather than only by reflection from the surface of card 40. Such an arrangement allows device 200 to be placed in proximity to the face of a display screen of a computer system, a television set, an ATM, or the like. By appropriate modulation of the pixels on the display screen, the swiping of a coded card 40 can be easily simulated, thereby allowing entry of data from the computer into device 200. In this fashion, the user could, for example access a page on the World Wide Web and receive coded information for establishing telephonic contact with the proprietor of the web page. This is somewhat analogous to the previously described use of magazine inserts imprinted with coded information.

Device 200 preferably includes additional input capabilities designated generally as 250. These may include, for example, an infrared or other light sensitive port to receive information transmitted by a computer or other intelligent electronic device, a conventional bar code reader, a magnetic stripe reader, etc. It will be understood, therefore, that the invention is not limited to the particular form of coded information delivered to device 200. Any media compatible with the sensory input characteristics of the device may be employed.

Input 250 may also comprise conventional electrical inputs such as a serial port or a PCMCIA slot. Such an input facilitates the ability to read and or share data with so-called "smart cards" which incorporate electronic memory devices.

The present invention is not limited to use as a method and device for merely placing telephone calls. The invention can also be advantageously employed for conducting a variety of telephonic transactions. Owing to the unique combination of features embodied in device 200, it can function as an electronic wallet to telephonically access and pay for goods and services. Thus, device 200 can be used to access a central system in the manner described above for the purpose of conducting a transaction rather than merely gaining access to a telephone carrier. Such a central system could be operated, for example, by a catalog sales company. A customer would utilize device 200 to place a call to the catalog company's system and, upon the appropriate prompt, to provide a customer identification number. The balance of the transaction can be accomplished by conventional voice prompt and key response means. Once a desired transaction is confirmed, the customer's account may be automatically debited or a debit may be processed through a predesignated charge card of the customer.

Device 200 can also be employed to further automate such transactions. With microphone and tone processor 240, DTMF tones transmitted from the central system may be readily converted to text for display to the customer on display 220. Responses may then be entered using keyboard 210. Device 200 can therefore be utilized as an intelligent terminal for communicating with the central system. In this fashion, device 200 can also be employed as an intelligent visual interface for navigating through audio text services and voice mail systems to obtain and/or convey information. Device 200 can thus be used to access stock quote systems such as provided by Dow Jones, movie information systems and the like.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A system for providing access to a telephonic communications service comprising:
   a prepaid calling card having an optically encoded access code printed thereon;
   a portable device having a reader for reading the access code printed on the card and a tone generator for generating audible tones corresponding to said access code, said tone generator adapted to issue said audible tones into a telephone microphone;
   a central system accessible by telephone for receiving and accepting said access code and for providing access to the telephonic communications service upon acceptance of said access code.

2. The system of claim 1 wherein the portable device comprises a telephone.

3. The system of claim 1 wherein the prepaid calling card further includes an optically encoded telephone number printed thereon.

4. A method for accessing a telephonic communication service comprising the steps of:
   providing a prepaid calling card having an optically encoded access code printed thereon;
   providing a portable device having a reader for reading the access code printed on the card and a tone generator for generating audible tones corresponding to said access code;
   passing the card across the reader to read the access code;
   connecting by telephone to a central system that provides access to the telephonic communications service;
   actuating the portable device to generate the audible tones corresponding to the access code into the telephone;
   validating the access code at the central system to provide access to the telephonic communications service upon acceptance of the access code.

5. The method of claim 4 wherein the step of connecting by telephone to the central system comprises actuating the portable device to generate audible tones corresponding to an access telephone number.

6. The method of claim 5 wherein the access telephone number is encoded on the card in proximity to the access code.

7. The system of claim 1 wherein the portable device further includes a memory for storing the access code.

8. The system of claim 3 wherein the portable device further includes a memory for storing the telephone number and the access code.

9. The system of claim 8 wherein the portable device further includes manually operable controls for selectively generating audible tones corresponding to the access code and audible tones corresponding to the telephone number.

10. The system of claim 1 wherein the portable device comprises a paging receiver.

11. The system of claim 1 wherein the audible tones are DTMF tones.

12. The system of claim 4 wherein the audible tones are DTMF tones.

* * * * *